United States Patent [19]

Basa et al.

[11] 4,313,966

[45] Feb. 2, 1982

[54] COLORANTS FOR LIPID-BASED EDIBLE COMPOSITIONS AND LIPID-BASED COMPOSITIONS MADE THEREFROM

[75] Inventors: Kenneth B. Basa, Evanston; Robert G. Agusto, Chicago, both of Ill.

[73] Assignee: National Can Corporation, Chicago, Ill.

[21] Appl. No.: 967,972

[22] Filed: Dec. 11, 1978

[51] Int. Cl.³ .................. A23L 1/275; A23G 1/00
[52] U.S. Cl. .................. 426/250; 426/540; 426/613; 426/653; 426/660
[58] Field of Search .......... 426/250, 540, 607, 613, 426/103, 653, 589, 660

[56] References Cited

U.S. PATENT DOCUMENTS

| | | | |
|---|---|---|---|
| 1,193,739 | 8/1916 | Till | 426/589 |
| 2,524,291 | 10/1950 | Hoffman | 426/540 |
| 3,035,923 | 5/1962 | Geisler | 426/540 |
| 3,139,346 | 6/1964 | Meusel et al. | 426/250 |
| 3,483,002 | 12/1969 | Stein | 426/540 |
| 3,618,588 | 11/1971 | Anwar et al. | 426/540 |
| 3,851,070 | 11/1974 | Sessoms | 426/540 |
| 4,100,301 | 7/1978 | Friello et al. | 426/540 |

*Primary Examiner*—Jeanette M. Hunter
*Attorney, Agent, or Firm*—Neuman, Williams, Anderson & Olson

[57] ABSTRACT

Food colorant compositions containing powdered caramel color, and powdered caramel in conjunction with color enhancers such as yellow and, optionally, yellow and blue, certified food color lakes providing brown or cocoa coloring to lipid-based edible compositions and lipid-based artificial chocolate compositions.

5 Claims, No Drawings

COLORANTS FOR LIPID-BASED EDIBLE COMPOSITIONS AND LIPID-BASED COMPOSITIONS MADE THEREFROM

BACKGROUND OF THE INVENTION

1. Field of the Invention

This invention relates to lipid dispersible color compositions for food products and to lipid-based edible compositions, including artificial chocolate, incorporating said color compositions.

2. Description of the Prior Art

Cocoa, coffee, maple, cinnamon, walnut, pecan and other natural products are frequently used to impart their characteristic flavor and aroma to lipid-based food coating or filling compositions. Their normal brown or tan coloration is associated with the charactic flavor and aroma of the products wherein they are incorporated. By "lipid-based" is meant any lipid-containing food compositions which contain a significant or substantial amount of a fat or oil base and in which no water has been added during the normal or conventional food processing or manufacture sequence. "Compound coatings", as that term is used in the art, are lipid-based food compositions which serve as coatings for candies, cookies or frozen confection bars. These compound coatings may be derived from a variety of natural foods, such as cocoa. They also include coatings associated with well known flavors, such as maple, coffee, etc. However, in compound coatings certain processed fats are employed as the principal lipid fraction. The lipid of a chocolate coating is cocoa butter, while in other coatings other cocoa butter-like fats or shortenings are employed. The characteristics of the broad varieties of available processed fats are varied, making it possible to exercise control of the physical, organoleptic and rheological characteristics of the coatings, such as sheen, mouth feel, viscosity, melting and setting temperatures, and resistance to rancidity.

"Creme" fillings are confectionary-type food compositions containing the characteristic imparting flavorant such as cocoa, coffee or maple flavor, powdered sugars, and lipids such as shortening, and optionally containing other food adjuncts which impart desired texture, additional flavor, bulk or color. Creme fillings are typically used as the fillers for sandwich cookies and wafers.

Shortages in natural products, such as cocoa and coffee, have resulted in wide fluctuations in the price of these commodities. It is therefore desirable and economically attractive to employ edible substitutes for these natural products in foods which contain and are associated with these natural products and closely simulate their color and flavor. Likewise, some people are allergic to certain nonessential components found in natural food products and nonallergenic substitutes for these natural products would be and are desirable.

The use of United States Certified Food Colors, i.e., FD&C Colors (Food Drug & Cosmetic Colors) as such, or in the form of insoluble precipitated "lakes", as colorants for food compositions, including compositions that are lipid-based, is known.

It has also been determined that brown hues may be obtained by blending certain blue, yellow and red FD&C colors or color lakes thereof. The red color is required in such compositions to introduce the reddish tint characteristic of chocolate, cocoa, coffee, maple, cinnamon, ginger and other colors.

However, due to governmental regulation, the permissible uses of certain red colors or lakes made therefrom in food compositions are limited. Some red food colors and lakes are permitted in the United States, but not in Canada, while others are permitted in Canada, but not in the United States. Thus, restrictions are placed on the FD&C colors that can be blended to attempt to produce brown hues which are, at the same time, compatible with the food additive regulations of both countries. In particular, FD&C Red No. 40 (Allura Red) is permitted in the United States but not in Canada; FD&C Red No. 2 (Amaranth) is permitted in Canada, but not in the United States.

The only red color acceptable in both Canada and the United States, therefore, is FD&C Red No. 3 (Erythrosine). This colorant, however, is not suitable for use in many food compositions because it demonstrates poor stability on exposure to light and/or acid environments. For example, when FD&C Red No. 3 is mixed with the other colors (blue and yellow) to produce a brownish color blend, it has been observed to fade on exposure to light, leaving the residual color blend (green) as the dominant hue.

The use of caramel to impart brown hues to aqueous based foodstuffs is known. Caramel, which is carefully controlled burnt carbohydrate, usually dextrose or sucrose, is a water soluble, but lipid insoluble color additive, regulated and permitted in both the United States and Canada. As an article of commerce, it is available as a viscous, dense liquid, or as a drum-dried or spray-dried solid in powder or particulate form.

U.S. Pat. No. 2,651,576 teaches the use of powdered caramel coloring dissolved in water base systems, such as cola-type and other brown-hued beverages, artificial maple syrups, artificial vanilla flavors, sugar-based confections, bread and beer. Another use for caramel color in the dried form is found in U.S. Pat. No. 2,841,499, where dry caramel is added to a powdered mix, which powder is subsequently dissolved in water to make the final product. However, there is no teaching of the use of caramel for the coloring of lipid-based food compositions.

Finally, while the industry uses insoluble pigments, particularly color lakes, in lipid systems, there is no teaching of the use of the lipid insoluble caramel color as a pigment in a lipid system.

The prior art also discloses the use of water soluble-oil insoluble dyes in non-aqueous food compositions, but only when special provision is made to disperse those dyes. For example, U.S. Pat. No. 3,677,691 requires a three-step process to convert a water soluble colorant into an oil soluble colorant. Included in this process is the dissolution of the colorant in a polyhydric alcohol, followed by admixture and heating at 150° C. with a solution of glycerol fatty acid ester converting agent to make a dye "complex".

U.S. Pat. No. 1,919,025 discloses the use of lanolin to effect an even distribution of water soluble food colors in fatty foodstuffs. Similarly, U.S. Pat. No. 3,489,573 indicates that, in order to use water soluble coloring materials in fatty compositions, the dye may be emulsified in a fatty acid ester of polyglycerol. U.S. Pat. No. 2,524,291 also describes dispersion of an aqueous solution of the dye in an emulsifier such as lecithin.

Yet another method of utilizing oil insoluble dyes in fatty compositions is described in U.S. Pat. No. 2,686,722. There, the dyes, being partially alcohol soluble, are first dissolved in alcohol, and then combined with the food composition. The temperature is raised to volatilize the alcohol, but the dyes remain in the composition.

Finally, U.S. Pat. No. 1,371,450 discloses a method of incorporating fat-incompatible (but otherwise unidentified) colors in confectionary coatings and fillings which use fat as the liquefying ingredient. The procedure taught involves adding the color to sugar (or similar component miscible with the color) and then milling the colored sweetener with the fat liquefying component to obtain a uniformly colored product.

Each of the above-cited prior art patents have in common the feature of requiring a special step, typically emulsification or "complexing" by which the oil insoluble colorant can be introduced into the fatty food composition. None of these references teach the use of caramel as a pigment to provide a brown color for lipid-based foods.

The food color industry, therefore, remains without a satisfactory method for imparting stable brown or chocolate or similar color hues to lipid-based food compositions, other than by the use of the natural products, and particularly lacks a method of coloration of lipid-based food compositions which is relatively simple, inexpensive, produces a stable food colorant, is not detrimental to health and can be marketed without contravening governmental restrictions.

OBJECTS OF THE INVENTION

It is therefore an object of the present invention to provide edible color blend compositions for lipid-based food compositions to replace in whole or in part the natural products heretofore used, which color blend compositions overcome the aforementioned shortcomings of previous color substitutes and, additionally, to provide compound coatings and fillings that may be substituted for the natural product-derived compound coatings and fillings.

It is a further object of the present invention to provide an economical substitute for conventionally employed natural ingredients, such as cocoa, to impart the normally associated brown hues to lipid-based food compositions.

It is also an object of the invention to provide a food colorant composition which is accepted as safe when ingested and, therefore, not restricted or banned by governmental regulations in the United States or other countries.

Another object of the invention is to provide a food colorant which is color stable in a wide range of compositions in which it is employed, including acid conditions, and under the conditions in which food compositions are commonly exposed, such as light and heat.

A further object of the invention is to provide a color blend composition for lipid-based food compositions that will furnish a wide range of brown shades based on blend variations and which will, therefore, closely match natural colorants.

A still further object is the provision of lipid-based compositions, especially confection-type compositions, that closely simulate compound coatings and fillings made from natural ingredients such as cocoa and chocolate, or the like.

SUMMARY OF THE INVENTION

The foregoing objects are achieved by the present invention which in one broad aspect includes edible, food grade colorant compositions which provide brown colors, including the characteristic cocoa or chocolate brown hues, to lipid-based food compositions. The dry colorant compositions used in the present invention are in the broadest form a dry, pulverulent, water soluble, lipid insoluble caramel powder. More particularly, novel colorant compositions which are uniform, pulverulent, dry blends of lipids insoluble caramel powder, admixed with color enhancers such as yellow, and mixtures of yellow and blue, food grade lakes and their use as colorants in lipid-based food products are disclosed.

In one broad form the present invention relates to an edible, pigmented brown, lipid-based food composition comprising a lipid and a finely divided caramel powder uniformly dispersed throughout said composition.

The present invention also relates to a method of forming an essentially water-free, lipid-based, edible food composition having a brown coloration which comprises admixing a water-soluble, lipid insoluble caramel powder in highly divided form with an edible food grade lipid material in an amount sufficient to impart a uniform brown coloration to said lipid.

More particularly, the present invention relates to the use of dried caramel color in finely divided, pulverulent, powdered form as a pigment dispersed in lipid-based food compositions to impart a brown or chocolate or similar coloration to the said food product wherein incorporated and to brown colored lipid-based food compositions made in accordance with this procedure. Accordingly, a method of imparting a brown or chocolate coloration to lipids and lipid-based food compositions by the addition to the lipid or lipid-based foodstuffs of a finely divided caramel color as a pigment is here provided, as well as brown colored lipid-based food compositions containing caramel as a pigment made by that method. The basic brown color imparted to lipids or lipid-based compositions by the use of caramel as a pigment in dispersed form in a preferred form of the invention may also be modified by the addition of other dry supplemental colorant or enhancers such as the Yellow No. 6 and, optionally, combinations of Yellow No. 6 and Blue No. 2, food grade lakes.

The absence of the regulated red FD&C food colors obviates objections or prohibitions with respect to the use of FD&C Red No. 2 (Amaranth) and Red No. 40 (Allura Red) and the absence of FD&C No. 3 (Erythrosine) eliminates the attendant problems of light and acid instability which are known to be associated with the use of that product. Caramel as a food color additive, while subject to regulation, is permitted in Canada, the United States and other countries. It is universally recognized as a safe, edible substance, and exhibits exceptional stability. Furthermore, it is economical in comparison to both natural brown hued ingredients and food color lakes. It also provides coloring that closely matches the hues imparted by many brown colored natural ingredients.

Accordingly, the present invention fulfills the objective of providing a satisfactory food grade brown, cocoa or chocolate coloring composition that is non-toxic, edible, color stable in light and air and free of potential hazards to human health. The compounded, colored, pigment compositions of the present invention, when used alone or particularly when compounded with flavorants and diluents, are suitable artificial replacements for all or part of the cocoa conventionally used in compound coatings and creme fillers containing cocoa, as well as other lipid-based food compositions characterized by brown hues such as coffee and maple coatings and fillers.

DETAILED DESCRIPTION OF PREFERRED EMBODIMENTS

In accordance with the present invention, the dry caramel pigment and the color enhanced dry caramel pigment and the FD&C color lake blends of the present invention may be used to impart a wide range of brown hues to lipid-based food compositions. Thus, the normal color imparted by natural ingredients such as cocoa, coffee, maple, cinnamon, walnut and pecan, may be provided by caramel pigment and caramel pigment based color blends. Examples of lipids used as a base for the aforenoted food compositions are vegetable fat, vegetable oil, animal fat, animal oil, butter, cocoa butter, butter oils and so-called hard butters, each of which may be blended, fractured, partially hydrogenated or completely hydrogenated. The lipids preferably melt in the range of about 89° F. to 114° F. (31°–46° C.). Other melting ranges may be preferable depending on season and geographic location, e.g., a range of 108° F. to 114° F. (42°–46° C.) for use during summer and in the southern United States.

The caramel pigment used alone or supplemented or enhanced by the addition of Yellow No. 6 lake or a combination of Yellow No. 6 and Blue No. 2 lake, may be used as such to provide the color customarily imparted to the lipid-based food by the natural product which it replaces. Preferably, the colorant is compounded as a part of a total color- and flavor-imparting concentrate product which comprises the dry caramel pigment colorant or enhanced colorant blend, a flavor ingredient and a diluent, carrier or bulking agent, such as sugar, corn flour or the like. The color blends may be used to supply all of the color associated with the natural product which it is intended to replace or may replace only a portion thereof. In one preferred embodiment the natural food ingredient is replaced by the color substitute or artificial product on a one-to-one weight ratio basis.

Caramel powder and the color blends of caramel powder and the color enhancing food dye lakes of the present invention are, as indicated above, also used to impart a brown color to compound coatings and creme fillings of a confectionary type which consist mainly of powdered sugars and shortening. In keeping with the invention, other conventional adjuncts and additives such as lecithin, salt, whey powder, dry milk solids, natural cocoa, chocolate liquor and cocoa butter, may also be present in the creme filling or compound coating. In one preferred embodiment, the caramel or caramel colorant blends are used to impart a brown color to compound coatings which typically consist of a lipid or fat component, a powdered sugar component and, optionally, food adjuncts or additives such as those listed above.

The edible lipid-based food compositions such as compound coatings and creme fillings in general contain 2 to 6% by weight of colorant composition, from about 25%, preferably 30 to 40%, of edible lipids such as fat or hard butters and from about 50 to 60% sugar. Thus, the amount of caramel powder present in these food compositions, calculated by reference to the colorant compositions of the examples which follow and the instant specification, falls within the range of from about 1 to about 24% by weight of the lipid. Other diluents, filler or adjuncts such as non-fat milk solids or the like may be used in amounts of from about 4 to 12% by weight of the food compositions. The colorant composition may be caramel powder or caramel powder with the color enhancers Yellow No. 6 and Blue No. 2 lakes, as described above.

The caramel powder used as a pigment and coloring agent in the lipid-based food compositions described in the present invention are powdered, finely divided, pulverulent or particulate materials. Preferably, the caramel powder is such that 100% passes through a 100 mesh screen (U.S. Standard Sieve Series), although coarser grades such as (−80 mesh) or blends of −100 and −60 or 80 mesh may be used. The caramel powders used are usually spray dried but may also be drum dried material. They are water soluble, lipid insoluble materials. The color of the caramel materials is usually expressed in terms of Hue Index and the color intensity in terms of Tinctorial Power (K). Hue Index is defined by Linner in his paper "Caramel Coloring—A New Method of Determining Its Color Hue and Tinctorial Power", *Proc. Soc. of Soft Drink Technologists* (1970), Bulletin 571, as follows:

$$\text{Hue Index} = 10 \log (A_{0.51}/A_{0.61})$$

where $A_{0.51}$ is absorbancy at 0.51 microns and $A_{0.61}$ is absorbancy at 0.61 microns. Tinctorial Power, $K_{0.56}$ is determined from the equation:

$$K_{0.56} = A_{0.56}/cb$$

where $A_{0.56}$ is absorbancy at 0.56 microns, "c" is the concentration in grams per liter, and "b" is the cell thickness in centimeters.

Suitable caramel powders include the preferred Sethness RT-2 spray dried caramel which has a Hue Index of about $5.22 \pm 0.08$ and a Tinctorial Power of 0.325. A Sethness acid-proof powdered caramel which has a Hue Index of $3.9 \pm 0.10$ and a Tinctorial Power of 0.680, is also useful but less preferred.

The color blends of the present invention contain a lipid-insoluble powdered caramel pigment, Yellow No. 6 lake and, optionally, also Blue No. 2 lake. Yellow No. 6 lake is approximately 39% Yellow No. 6 dye adsorbed on about 61% by weight alumina, and Blue No. 2 lake is approximately 34% Blue No. 2 adsorbed on about 66% by weight alumina. The range of dye content in commercial Yellow No. 6 form is about 15–42% and in the case of Blue No. 2, 11–36%.

Colorant compositions containing caramel pigment and the color enhancer Yellow No. 6 lake as the principal colorants impart a natural brown hue when combined in ratios of from 99.5 to 60% spray dried caramel powder and 0.5% to 40% by weight Yellow No. 6 lake of the color component blend. Within this broad range for producing brown hues is a more limited, preferred range resulting in brown or cocoa colored shades where Yellow No. 6 lake constitutes from 0.5% to 6% by weight of the color blend and the balance (of 100%), powdered, spray dried caramel.

Optionally, and as a most preferred embodiment, the caramel powder blend used as the principal pigment in the colorant blend composition described above, supplemented with Yellow No. 6 lake as a color enhancer may be further supplemented and enchanced with Blue No. 2 lake for certain desirable brown shade variations. Satisfactory brown hues will be obtained by the use of from 0.1% to 10% by weight of Blue No. 2 lake in the colorant blend composition. Shades suitable as cocoa color simulations are produced when as little as 0.1% to 1% of Blue No. 2 lake is employed.

It should be understood that the foregoing percentage ranges of the Yellow No. 6 and Blue No. 2 lakes used as color enhancers are applicable to lakes having the higher concentration of FD%C dye. When lower dye concentration lakes are used, larger amounts of the lake must be used on a proportional basis.

It is also contemplated as part of the present invention to include as color supplements non-certified, food color additives such as paprika; carrot; annatto and turmeric; or their extracts or oleoresins; riboflavin, carotenoid colors; dehydrated beets; carmine; toasted, partially defatted cooked cottonseed flour; dehydrated grapeskin extract; dehydrated fruit juices; saffron or titanium dioxide.

Cocoa replacers which are one of the preferred compositions of the present invention are, broadly, concentrates comprising a pulverulent color blend composition containing from about 50 to 99.4% by weight of spray dried powdered caramel and 0.5 to 40% by weight of FD&C Yellow No. 6 lake. The color blend concentrate preferably also contains from 0.1 to 10% by weight of FD&C Blue No. 2 lake, said color blend being admixed with a flavorant for cocoa and a diluent such as sugar, powdered sugar or yellow corn flour. The flavorant may be a commercial artificial cocoa flavor (such as National Food Ingredient Co. No. 224-0400) or an admixture of artificial cocoa flavor and vanillin. A total cocoa replacer powder would contain, on a dry weight basis, about 20 to 45% powdered caramel; 2 to 10% FD&C Yellow No. 6 lake; 1 to 3% FD&C Blue No. 2 lake; 5 to 7% powdered, e.g. spray dried, cocoa flavor; and 35 to 72% diluent such as sugar or sugar and other powdered edible diluent.

The present invention will be more clearly understood from the following specific examples.

EXAMPLE 1

Color Blend

Ninety-six parts of spray dried powdered caramel pigment (Sethness RT-2, −100 mesh, Hue Index 5.25) is combined with 4 parts Yellow No. 6 lake (39% dye) to produce a brown, powdered color blend that is 96 parts by weight powdered caramel and 4 parts by weight Yellow No. 6 lake.

EXAMPLE 2

Cocoa Replacer

A pulverulent cocoa replacer composition is prepared by blending together 30% of the powdered caramel color blend prepared in Example 1, 6% spray dried artificial cocoa flavor (National Food Ingredient Co., a Division of National Can Corporation, NFIC Cocoa Flavor, Artificial No. 224-0400) and 64% by weight of powdered sugar.

EXAMPLE 3

Compound Coating

A compound coating is prepared by combining 59.75 parts by weight powdered sugar; 30.5 parts by weight of a hard butter (m.p. 99°–103° F.); 0.25 parts by weight flour salt; and 9.0 parts by weight of the cocoa replacer prepared in Example 2. The mixture is heated with stirring at a temperature between 140° and 150° F. for a period of about 2 hours to form a smooth melted blend.

To the melted blend is added 0.5 parts by weight of lecithin, heat is withdrawn and the blend is cooled to about 120° F. while stirring continuously. At this point, the resulting compound coating was used to enrobe a baked product. When fully cooled to 38°–40° F., the resulting product exhibits a cocoa brown shade fully acceptable as a substitute for the food color which is produced by cocoa at a 9% concentration.

The amount of caramel powder present in the compound coating so produced is 8.5% by weight of the lipid.

EXAMPLE 4

Color Blend

The procedure of Example 1 is followed with the exception that the caramel pigment (−100 mesh) constitutes 99.0 parts by weight of the color blend, and Yellow No. 6 lake constitutes 1.0 part. The resulting shade of a compound coating prepared as in Example 3 simulates that of Dutch-processed cocoa. This shade is darker in color than that produced according to Example 1 and is equally acceptable as an artificial food color.

EXAMPLE 5

Color Blend

Following the procedure of Example 1, a color blend was prepared by admixing 93.8 parts by weight powdered (−100 mesh) caramel pigment (Sethness RT-2), 6 parts by weight Yellow No. 6 lake and 0.2 part Blue No. 2 lake. This color blend was compatible with and evenly dispersible in fats and oils.

EXAMPLE 6

Cocoa Replacer

Thirty parts of the color blend prepared in Example 5 is admixed with 6 parts spray dried cocoa flavor, NFIC Cocoa Flavor, Artificial No. 224-0343; 0.5 part vanillin; 53 parts powdered sugar; and 10.5 parts of yellow corn flour (−100 mesh) to produce a pulverulent powdered cocoa replacer.

EXAMPLE 7

Compound Coating

Two parts of the cocoa replacer of Example 6 is blended with 38 parts of Ambrosia White Pearl Brand of "hard butter"; 49 parts of powdered sugar; 9.5 parts of powdered, non-fat dried milk solids; 0.5 part lecithin; 0.5 part salt; and 0.5 part vanillin at a temperature of 130°–140° F. for a period of 2 hours following the general procedure set forth in Example 3. The final product exhibited a cocoa brown color and a flavor that was commercially acceptable.

The amount of caramel powder present in the compound coating so produced is 1.48% by weight of the lipid.

EXAMPLE 8

Cocoa Replacer and Creme Filling

A color blend concentrate was prepared by admixing 42.5% powdered caramel pigment (Sethness RT-2, −100 mesh); 3.5% Yellow No. 6 lake; 1.0% Blue No. 2 lake; 47% powdered sugar; 5.0% spray dried NFIC cocoa flavor, Artificial No. 224-0343, (National Food Ingredient Co.); and 1.0% vanillin (−60 mesh) [Percentages are by Weight]. The resulting cocoa replacer was used as a cocoa extender in a sandwich cookie creme filling to replace part of the natural cocoa. This cocoa replacer was added to a creme filling base comprising 62% powdered sugar and 31% shortening, in an amount of 3.5% by weight of the filling with an equal amount (3.5%) of natural cocoa. The resulting creme filling has a chocolate brown shade approximating that produced using 12% natural cocoa. The creme filling composition used in sandwich cookies was considered to be acceptable from a color, texture and taste standpoint and compared favorably to a 100% natural cocoa flavored creme filling.

The amount of caramel powder present in the creme filling so produced is 4.79% by weight of the lipid.

EXAMPLE 9

Color Blend

A color blend of 96% by weight powdered caramel pigment (Sethness RT-2), 3.0% by weight Yellow No. 6 lake, and 1.0% by weight Blue No. 2 lake are combined to produce a blend that has an acceptable cocoa brown color.

EXAMPLE 10

Compound Coating

A compound coating is prepared by combining 62.5% by weight of powdered sugar; 33% by weight of hard butter (KAOKOTE, Durkee); 4% Sethness RT-2 spray dried caramel powder (100% −100 mesh, Hue Index 5.25); and 0.5 artificial cocoa flavor. The mixture is heated with blending at a temperature of between 135°–145° F. for a period of 2 hours. To the heated mixture is added 0.5% lecithin and the mixture stirred without added heat until it cools to 120° F. The resulting product was a compound coating have a dark cocoa brown shade similar in color to compound coatings made from natural chocolate.

The amount of the caramel powder present in the compound coating so produced is 12.1% by weight of the lipid.

EXAMPLE 11

Compound Coating

A compound coating for a light brown maple coating was prepared following the procedure of Example 10 using the following ingredients:

| | % |
|---|---|
| Durkee KAOKOTE (Hard Butter) | 36 |
| Sethness RT-2 Powdered Caramel (-100 Mesh), Hue Index 5.25 | 2 |
| Powdered Sugar | 60 |
| Maple Powdered Artificial) | 1 |
| Salt | .5 |
| Lecithin | .5 |
| Total | 100 |

The product had a tan color and is used as a maple coating for baked products.

The amount of caramel powder present in the compound coating so produced is 5.5% by weight of the lipid.

The foregoing discloses a variety of color blends, lipid-based, brown-hued coating and filling food compositions incorporating powdered caramel as a pigment or blends of powdered caramel color enhanced with Yellow No. 6 or combinations of Yellow No. 6 and Blue No. 2 lake.

Cocoa replacer compositions are also described which may be used to replace natural cocoa powder on a 1 for 1, or greater, replacement basis or as a concentrate, such as is shown in Example 8, wherein 3.5 parts of the cocoa replacer described replaces 9.5 parts of cocoa in various lipid-based food compositions. These cocoa replacers broadly contain 8 to 35% powdered caramel; 5 to 10% Yellow No. 6 lake; 1 to 3% Blue No. 2 lake; 1 to 7% cocoa flavor; and an amount of an edible diluent such as sugar to make 100%, i.e., 50 to 70% by weight. (When a cocoa replacer containing 8% caramel is incorporated in the compound coating of Example 8, a food composition results in which caramel powder is present in the amount of 0.9% by weight of the lipid.) These cocoa replacer compositions may be used as the sole flavored colorant or as a partial replacement for natural cocoa used in lipid-based confectionary food compositions, to produce the artificial cocoa or chocolate food products as are herein described with the usual variants, as are apparent to those skilled in the art.

What is claimed is:

1. An edible, pigmented, brown, essentially water-free, lipid-based confectionary food composition consisting essentially of a lipid having a melting point of from about 89° F. to about 114° F. (31° C. to 46° C.) and a color blend composition comprising a finely divided caramel powder having a Hue Index of at least 3.9±0.10 and an approved food color lake color enhancer selected from the group consisting of from about 0.5 to 4.0% Yellow No. 6 lake, and of from about 0.1 to 10% Blue No. 2 lake or mixtures thereof uniformly dispersed throughout said lipid composition, said caramel powder being present in an amount of from about 1% to about 24% by weight of said lipid and said percentages of lakes being based on total colorant blend.

2. A composition according to claim 1 wherein said composition additionally contains a flavorant.

3. A method of forming an essentially water-free, lipid-based, edible confectionary food composition having a brown coloration which consists essentially of admixing a color blend composition comprising a water soluble, lipid insoluble caramel powder in highly divided form having a Hue Index of at least 3.9±0.10 and, a color enhancer selected from the group consisting of from about 0.5 to 40% Yellow No. 6 lake, and from about 0.1 to about 10% of Blue No. 2 lake, or mixtures thereof, with an edible food grade lipid material having a melting point of from about 89° F. to about 114° F. (31° C. to 46° C.) in an amount sufficient to uniformly dispersed the caramel powder throughout the lipid composition to impart a uniform brown coloration to said lipid, said caramel powder being admixed to the extent of from about 1% to about 24% by weight of said lipid and said percentages of lakes being based on total colorant blend.

4. A method according to claim 3 wherein the caramel powder has a particle size of −100 mesh.

5. A method according to claim 3 wherein said caramel has a Hue Index of at least 5.22±0.08.

* * * * *